(12) United States Patent
Duch

(10) Patent No.: US 7,437,990 B2
(45) Date of Patent: Oct. 21, 2008

(54) ALL-IN-ONE DISPOSABLE CONTAINER FOR MAKING COFFEE, TEA AND OTHER MIXED BEVERAGES

(76) Inventor: Enrique Gámez Duch, 18 Calle 0-41, Zona 1, P.O. Box 332, Guatemala City (GT)

( * ) Notice: Subject to any disclaimer, the term of this patent is extended or adjusted under 35 U.S.C. 154(b) by 460 days.

(21) Appl. No.: 10/978,679

(22) Filed: Nov. 2, 2004

(65) Prior Publication Data

US 2005/0252382 A1    Nov. 17, 2005

Related U.S. Application Data

(60) Provisional application No. 60/570,950, filed on May 14, 2004.

(51) Int. Cl.
   A47J 31/00    (2006.01)
   B65D 81/34    (2006.01)
   B65B 29/02    (2006.01)
(52) U.S. Cl. ............... 99/297; 99/319; 99/323; 99/323.3
(58) Field of Classification Search ............ 99/297, 99/287, 295, 302 R, 317, 318, 319, 323, 323.3; 426/112, 115
See application file for complete search history.

(56) References Cited

U.S. PATENT DOCUMENTS

| | | | | |
|---|---|---|---|---|
| 1,346,485 | A | * | 7/1920 | De Arrigunaga ............ 99/297 |
| 1,699,303 | A | * | 1/1929 | Mennicke et al. ............ 99/297 |
| 2,749,834 | A | * | 6/1956 | Hiscock ................. 99/287 |
| 2,766,796 | A |   | 10/1956 | Tupper |
| 2,899,310 | A |   | 8/1959 | Dale |
| 3,657,993 | A | * | 4/1972 | Close ................. 99/297 |
| 3,796,813 | A |   | 3/1974 | Kurland |
| 3,935,318 | A |   | 1/1976 | Mihailide |
| 3,985,069 | A | * | 10/1976 | Cavalluzzi .............. 99/295 |
| 4,619,830 | A |   | 10/1986 | Napier |
| 4,699,794 | A |   | 10/1987 | Brice et al. |
| 4,806,369 | A |   | 2/1989 | Thompson |
| 5,180,079 | A |   | 1/1993 | Jeng |
| 5,441,752 | A |   | 8/1995 | Sandin |
| D381,866 | S |   | 8/1997 | St-Gelais |
| 5,664,480 | A |   | 9/1997 | DiFilippo |
| 5,755,149 | A | * | 5/1998 | Blanc et al. ............. 99/289 T |
| 6,269,736 | B1 |  | 8/2001 | Melton |
| 2004/0083897 | A1 | | 5/2004 | Park |

FOREIGN PATENT DOCUMENTS

EP    1 169 957    1/2002

* cited by examiner

*Primary Examiner*—Reginald L Alexander
(74) *Attorney, Agent, or Firm*—Dykema Gossett PLLC

(57) ABSTRACT

An all-in-one beverage container for providing a mixed beverage product. The container includes a cup for holding a liquid, and a percolating mechanism for holding a beverage mix at a predetermined location within the cup, the beverage mix being provided in a solid, granular, gel and/or packaged form. A filter may be coupled to the percolating mechanism for separating the beverage mix from liquid disposable in the cup, and a stem may be coupled to the percolating mechanism for enabling axial movement of the percolating mechanism relative to a longitudinal axis of the cup. The stem may enable mixing of the beverage mix with the liquid and enable removal of the percolating mechanism from the cup upon mixing of the beverage mix with the liquid for thereby providing the mixed beverage product. The invention thus provides an all-in-one beverage container which is easy to use, hygienic and disposable.

10 Claims, 3 Drawing Sheets

ALL-IN-ONE DISPOSABLE CONTAINER FOR MAKING COFFEE, TEA AND OTHER MIXED BEVERAGES

CROSS-REFERENCE TO RELATED APPLICATIONS

This application claims the benefit of U.S. Provisional Patent Application No. 60/570,950 filed May 14, 2004, hereby incorporated by reference in its entirety.

BACKGROUND OF INVENTION a. Field of Invention

The invention relates generally to beverage cups and the like, and, more particularly to a method and apparatus for producing high quality coffee, tea and other beverages in an all-in-one disposable beverage container.

b. Description of Related Art

In the art, there presently exist a variety of devices for mixing and producing beverages in disposable or non-disposable containers.

Known disposable or non-disposable containers for making beverages and the like are disclosed for example in U.S. Pat. Nos. 6,269,736, 5,664,480, 5,441,752, 5,180,079, 4,806,369, 4,699,794, 4,619,830, 3,935,318, 3,796,813, 2,899,310, 2,766,796 and Des. 381,866, the respective disclosures of which are incorporated herein by reference, EP 1,169,957 and U.S. Patent Application Publication No. 2004/0083897.

Of the aforementioned known disposable or non-disposable containers, U.S. Pat. No. 6,269,736 ('736 Patent), discloses a disposable infuser 1 for brewing beverages within an associated container 2, (see FIGS. 1-4). The infuser includes a centrally located well portion 6 for receiving a charge of particulate flavoring material, such as tea leaves 9 and the like. As shown in FIG. 4, well 6 includes a filter portion 10 which has a plurality of openings 12 which are formed without scrap "flash" or waste by shearing a tab or flap of material away from the filter portion of the well or piercing the filter portion of the well with a needle-shaped or knife-shaped protrusion in the mold. The resulting tabs or punctures serve to keep the particulate flavoring material out of the brewed beverage. Although somewhat functional, the beverage container of the '736 Patent is limited in application to flavoring a liquid by tea or other such flavors, without having the capacity for multiple flavoring such as coffee, sugar, cream and the like, at predetermined or subjective quantities by an end-user. Moreover, as readily evident, the beverage container of the '736 Patent has limited mixing capability of the tea or other such flavoring, and even with the provision of a spoon or other such devices for mixing the flavoring, the container has limited capabilities of allowing the beverage to be mixed since the flavoring is disposed in a restricted area defined by well 6.

U.S. Patent Application Publication No. 2004/0083897 ('897 Application), discloses an instant coffee-brewing container S that includes a cup cover 4, a dripper 2, a filter 3, and a coffee-ground bag 5, all being packed into a package container B, (see FIGS. 1 and 2). The cup cover or dripper is detachably coupled to the top opening of a beverage cup so as to cover the top opening. The cup cover further includes an upwardly-projected drinking port 4' with a hole at the center or one side of the cup cover. In order to use the coffee-brewing container of the '897 Application, the package container B is first opened, and then dripper 2 is coupled to beverage cup 1. Next, filter paper 3 is inserted into dripper 2, coffee grounds inside the coffee-ground bag 5 are fed into filter paper 3, and then hot water is poured into the cup so as to prepare the brewed coffee. As discussed above for the '736 Patent, the coffee-brewing container of the '897 Application is limited in application to flavoring a limited amount of coffee or tea provided in the container, without having the capacity for multiple flavoring such as coffee, sugar, cream and the like, at predetermined or subjective quantities by an end-user. Moreover, as readily evident for the '897 Application, the coffee-brewing container of the '897 Application has limited mixing capability of the tea or other such flavoring, even with the provision of a spoon or other such devices for mixing the flavoring.

U.S. Pat. No. 3,935,318 ('318 Patent), discloses an apparatus for brewing a beverage such as coffee or tea, which includes a disposable disc-shaped receptacle 12 containing a predetermined quantity of solid beverage material, (see FIG. 1). The flat lower surface of the receptacle contains a plurality of perforations 22 permitting a flow of hot water into the receptacle for brewing the beverage material. An actuating rod or stick 13 is attached to the membrane for manually flexing the membrane up and down during brewing. In use, a user places the receptacle into a cup of hot water and using the stick, manually flexes the membrane up and down inducing pressure variations inside the receptacle. These pressure variations suck and expel hot water through the perforations and circulate the water inside the receptacle and throughout the beverage material for brewing. Once mixed, the receptacle is removed from the cup and discarded when the liquid beverage reaches the desired strength. As discussed above for the '736 Patent and '897 Application, the coffee-brewing container of the '318 Patent is limited in application to flavoring a limited amount of coffee or tea provided in the container, without having the capacity for multiple flavoring such as coffee, sugar, cream and the like, at predetermined or subjective quantities by an end-user. The coffee-brewing container of the '318 Patent also has limited mixing capability of the tea or other such flavoring, due to the dynamics of liquid flow through disc-shaped receptacle 12.

It would therefore be of benefit to provide an all-in-one disposable beverage container which is more versatile in operation than the prior art beverage containers discussed above so that an end user can subjectively flavor coffee, tea and other such beverages, with sugar, cream and other such additives, as desired. It would also be of benefit to provide an all-in-one disposable beverage container which is cost-effective in design, which is simple and economical to manufacture, and which is sanitary in operation for mixing and disposing of used product.

SUMMARY OF INVENTION

The invention solves the problems and overcomes the drawbacks and deficiencies of prior art beverage containers by providing an all-in-one disposable beverage container which is simple yet versatile in operation.

Thus an object of the present invention is to provide an all-in-one disposable beverage container which allows an end user to subjectively flavor coffee, tea and other such beverages, with sugar, cream and other such additives, as desired.

Another object of the present invention is to provide an all-in-one disposable beverage container which is cost-effective in design, yet sanitary in operation for mixing and disposing of used product.

Yet a further object of the present invention is to provide an all-in-one disposable beverage container which has superior liquid flow dynamics for mixing a beverage mix with a liquid.

The invention thus provides an all-in-one disposable beverage container which includes a cup for holding a liquid, and a percolating mechanism for holding a beverage mix at a predetermined location within the cup. The beverage mix may be provided in a solid, granular, gel and/or packaged form. A filter may be coupled to the percolating mechanism for separating the beverage mix from liquid disposable in the cup. A stem may be coupled to the percolating mechanism for enabling axial movement of the percolating mechanism relative to a longitudinal axis of the cup. The stem may enable mixing of the beverage mix with the liquid by axial reciprocation of the percolating mechanism and enable removal of the percolating mechanism from the cup upon mixing of the beverage mix with the liquid for thereby providing the mixed beverage product. The all-in-one beverage container thus enables a consumer to know and to choose the type of beverage mix the consumer prefers, and thereby prepare a customized mixed beverage product.

For the all-in-one beverage container described above, the percolating mechanism may include top and bottom percolation elements. The top and bottom percolation elements may be separable from each other to enable insertion of the beverage mix between the top and bottom percolation elements. Alternatively, the top and bottom percolation elements may be presealed together and include the beverage mix between the top and bottom percolation elements. The top percolation element may include a plurality of preformed first perforations. The first perforations may be disposed at predetermined radial and angular intervals. The bottom percolation element may also include a plurality of preformed second perforations. The second perforations may be likewise disposed at predetermined radial and angular intervals. The top and bottom percolation elements may be aligned such that the first and second perforations are axially aligned such that liquid flows in a generally axial direction from a first or second perforation to an axially corresponding second or first perforation during axial reciprocation of the percolating mechanism for providing optimal mixing. The top and bottom percolation elements may be aligned by means of a notch on the top percolation element being aligned with a rib on the stem attached to the bottom percolation element, or vice versa. Alternatively, the top and bottom percolation elements may be aligned such that the first and second perforations are axially offset such that liquid flows in a generally transverse direction from a first or second perforation to a corresponding second or first perforation during axial reciprocation of the percolating mechanism. The stem described above may be hollow. The all-in-one beverage container may further include a spoon disposed within the hollow stem such that the spoon enables stirring of the beverage mix after removal of the percolating mechanism.

The invention yet further provides an all-in-one beverage container for providing a mixed beverage product. The container may include a cup for holding a liquid, and means for holding a beverage mix at a predetermined location within the cup. The beverage mix may be provided in a solid, granular, gel and/or packaged form. A means for reciprocating may be coupled to the means for holding for enabling axial movement of the means for holding relative to a longitudinal axis of the cup. The means for reciprocating may enable mixing of the beverage mix with the liquid by axial reciprocation of the means for holding and enable removal of the means for holding from the cup upon mixing of the beverage mix with the liquid for thereby providing the mixed beverage product. The all-in-one beverage container thus enables a consumer to know and to choose the type of beverage mix the consumer prefers, and thereby prepare a customized mixed beverage product.

For the all-in-one beverage container described above, the means for holding may include top and bottom percolation means. The top and bottom percolation means may be separable from each other to enable insertion of the beverage mix between the top and bottom percolation means. Alternatively, the top and bottom percolation means may be presealed together and include the beverage mix between the top and bottom percolation means. The top percolation means may include a plurality of preformed first perforations. The first perforations may be disposed at predetermined radial and angular intervals. The bottom percolation means may also include a plurality of preformed second perforations. The second perforations may be disposed at predetermined radial and angular intervals. The top and bottom percolation means may be aligned such that the first and second perforations are axially aligned such that liquid flows in a generally axial direction from a first or second perforation to an axially corresponding second or first perforation during axial reciprocation of the means for holding for providing optimal mixing. The top and bottom percolation means may be aligned by a notch on the top percolation means being aligned with a rib on the means for reciprocating attached to the bottom percolation means, or vice versa. Alternatively, the top and bottom percolation means may be aligned such that the first and second perforations are axially offset such that liquid flows in a generally transverse direction from a first or second perforation to a corresponding second or first perforation during axial reciprocation of the means for holding. The means for reciprocating may be hollow. The container may further include a spoon disposed within the hollow means for reciprocating such that the spoon enables stirring of the beverage mix after removal of the means for holding. The container may also further include a filter coupled to the means for holding for separating the beverage mix from liquid disposable in the cup.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Figure 1:
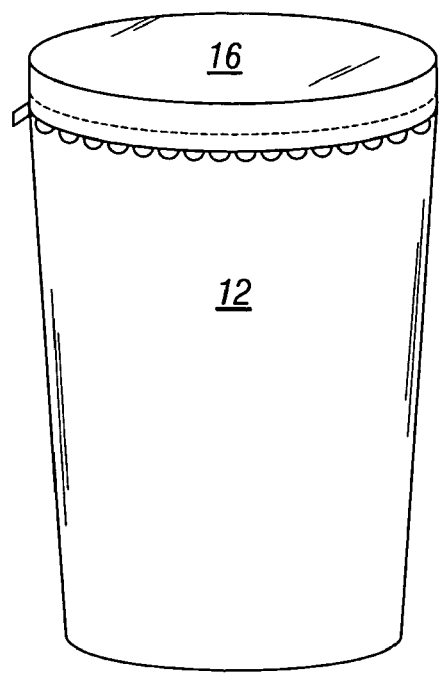
FIG. 1 is a front elevation view illustrating the all-in-one disposable mixed beverage container according to the present invention.

Referring now to the drawings wherein like reference numerals designate corresponding parts throughout the several views, FIGS. 1-8 illustrate an all-in-one disposable mixed beverage container according to the present invention, generally designated "beverage container 10."

Referring to FIGS. 1-8, one key goal of the present invention is to facilitate the complete preparation of a cup of coffee, tea or other such mixed beverages in a fast, practical and easy way by means of a portable and disposable cup. In the case of coffee and tea products, beverage container 10 according to the present invention includes the requisite space to place bags of sugar, sweetener and non dairy cream to obtain a complete and personalized beverage.

Figure 2:
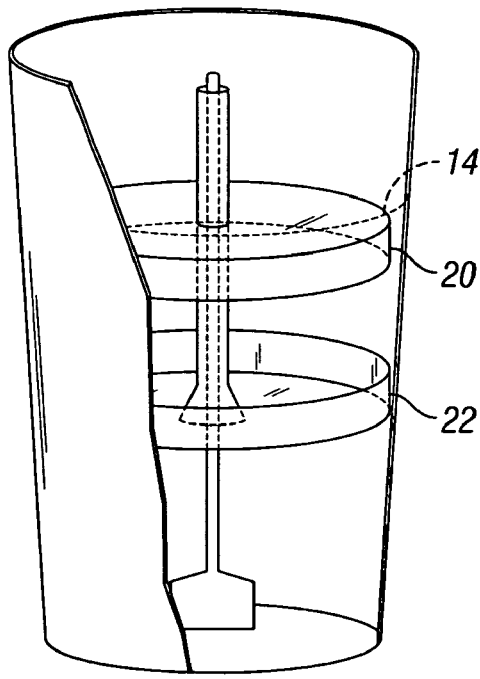
FIG. 2 is a front elevation view, partially broken away, illustrating the internal components of the all-in-one disposable mixed beverage container of FIG. 1.
Figure 3:
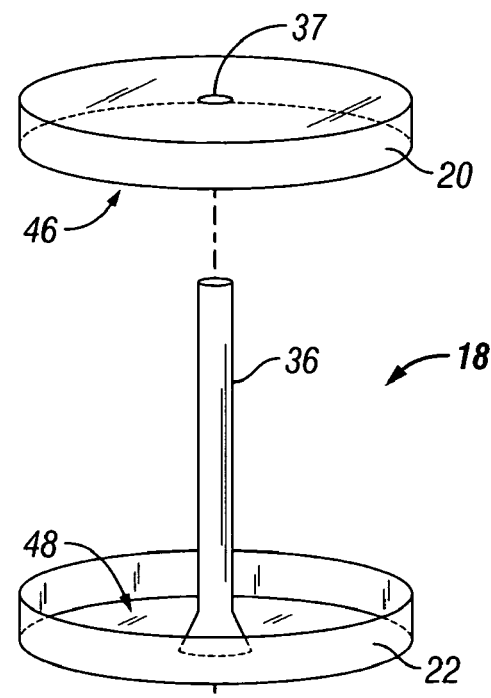
FIG. 3 is an exploded view of the various internal components of the all-in-one disposable mixed beverage container of FIG. 1.

As shown in FIGS. 1-3, beverage container 10 according to the present invention includes a cup 12 made out of a disposable material (rigid foam or similar) with a filling line 14 for indicating an amount of hot water or other liquid needed. A cup lid or seal 16 may be provided to cover the contents of beverage container 10 for shipping, sale and/or sealing the contents of the container after use for discarding the container. Lid or seal 16 may be made of a plastic, cardboard or other biodegradable material. Although lid or seal 16 has been illustrated as being a peelable or tearable lid, those skilled in the art would appreciate in view of this disclosure that lid 16 may be formed of a plastic or thick cardboard material such that the lid can be removed as a single unit. Furthermore, although not illustrated, in the case of a plastic or thick cardboard material, lid or seal 16 may include a spout (not shown) for allowing a user to consume the mixed contents of beverage container 10 to minimize the risk of spilling the contents of the container. Lid or seal 16 may also be transparent for allowing the contents within the cup (i.e. non-dairy cream, sweetener, etc.) to be seen therethrough. The exact content of the cup may be based upon ergonomic factors and chosen based upon marketing studies.

Figure 4:
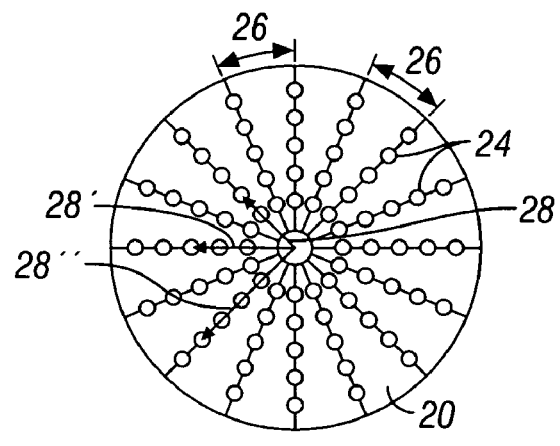
FIG. 4 is a top view of a top percolation element for the all-in-one disposable mixed beverage container of FIG. 1.
Figure 5:
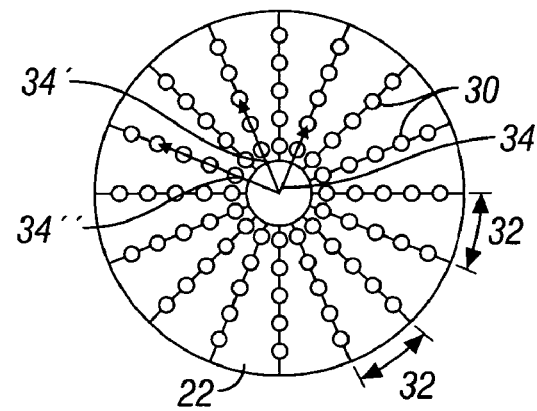
FIG. 5 is a bottom view of a bottom percolation element for the all-in-one disposable mixed beverage container of FIG. 1.
Figure 6:
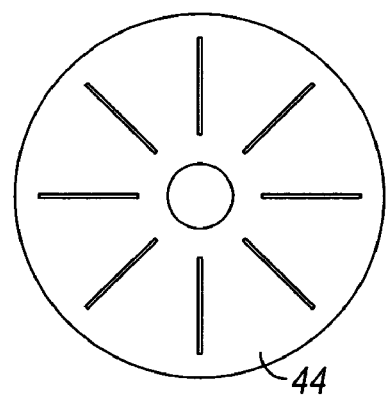
FIG. 6 is a top/bottom view of the filter disposable between the top/bottom percolation elements for the all-in-one disposable mixed beverage container of FIG. 1.

In the case of coffee and tea products, beverage container 10 may include a percolating mechanism 18 for percolating coffee/tea inside. In the embodiment of FIGS. 2 and 3, percolating mechanism 18 may include top and bottom percolation elements 20, 22, respectively, made of plastic and other similar material. As shown in FIG. 4, top percolation element 20 may include a plurality of perforations 24 for allowing water or other liquid to pass therethrough. Perforations 24 may be disposed at fixed angular intervals 26, and further at fixed radial distances 28, 28', 28" etc. Likewise, as shown in FIG. 5, bottom percolation element 22 may include a plurality of perforations 30 for allowing water or other liquid to pass therethrough. Perforations 30 may also be disposed at fixed angular intervals 32, and further at fixed radial distances 34, 34', 34" etc. In the embodiment shown, intervals 26 may be generally equal to intervals 32, and radial distances 28, 28', 28" etc., may respectively correspond to radial distances 34, 34', 34" etc. In an alternative embodiment of beverage container 10, intervals 26 may be generally unequal to intervals 32, and radial distances 28, 28', 28" etc., may be generally unequal to radial distances 34, 34', 34" etc. The reasoning for the equal vs. unequal angular/radial intervals will be described in greater detail below.

As shown in FIG. 2, top and bottom percolation elements 20, 22, respectively, may be sized such that top element 20 is of a slightly smaller diameter so as to fit within bottom element 22. Those skilled in the art would appreciate in view of this disclosure that elements 20, 22 may be sized such that bottom element 22 is alternatively of a slightly smaller diameter so as to fit within top element 20, or another alternative means may be provided so as to seal the engagement between top and bottom percolation elements 20, 22, respectively.

In the embodiment of FIG. 2, bottom percolation element 22 may include a hollow stem 36 formed therewith such that top percolation element 20 is slidingly disposed on stem 36. In the configuration of FIG. 2, the outer diameter of stem 36 may be sized such that stem 36 is disposed within aperture 37 in top percolation element 20, and top percolation element 20 slides, as well as rotates relative to stem 36. In this embodiment, it becomes readily evident that when top percolating element 20 is disposed on stem 36 and slid downwards to sealingly engage bottom percolating element 22, perforations 24 and 30 may be disposed in axial alignment with each other such that a perforation 24 has a corresponding perforation 30 disposed thereunder. Under these circumstances, when top and bottom percolation elements 20, 22, respectively, are engaged and thereafter moved upwards and downwards by means of stem 36, water or other liquid flows in a generally axial direction from a top or bottom perforation to an axially corresponding bottom or top perforation. Alternatively, perforations 24 and 30 may likewise be disposed out of axial alignment with each other such that a perforation 24 does not have a corresponding perforation 30 disposed thereunder. Under these circumstances, when top and bottom percolation elements 20, 22, respectively, are engaged and thereafter moved upwards and downwards by means of stem 36, water or other liquid flows in a generally transverse direction from a top or bottom perforation to a corresponding bottom or top perforation.

Figure 7:
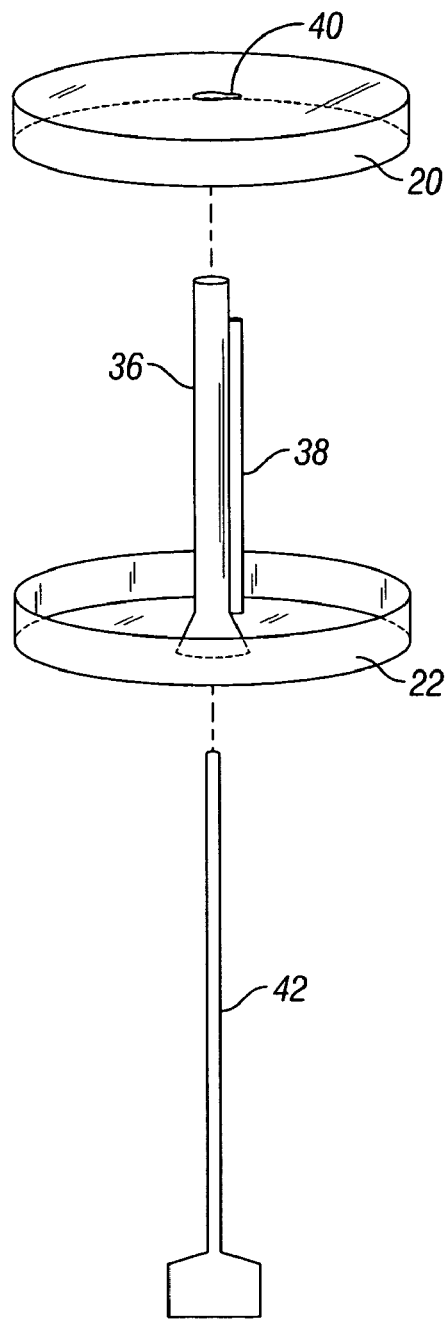
FIG. 7 is an alternative embodiment of the bottom percolation element for the all-in-one disposable mixed beverage container of FIG. 1.
Figure 8:
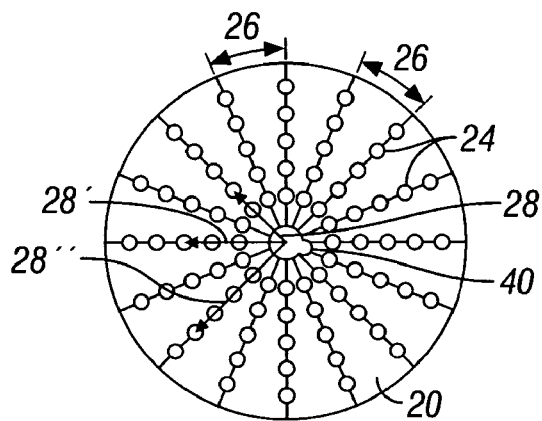
FIG. 8 is an alternative embodiment of the top percolation element for the all-in-one disposable mixed beverage container of FIG. 1.

It has been found that although transverse water or other liquid flow between the top and bottom perforations 24, 30, respectively, provides satisfactory mixing, axial flow provides optimal mixing. Accordingly, as illustrated in FIGS. 7 and 8, stem 36 may be provided with alignment rib 38 such that when rib 38 is disposed in notch 40 (or vice versa if a rib is provided in aperture 37 for alignment with a notch in stem 36), the arrangement enables predetermined alignment of top and bottom percolation elements 20, 22, respectively. In this manner, top and bottom percolation elements 20, 22, respectively, may be oriented such that water or other liquid flows in a generally axial direction from a top or bottom perforation to an axially corresponding bottom or top perforation, so as to provide optimal beverage mixing.

Referring next to FIGS. 2 and 3, a spoon 42 may be disposed within stem 36. Additionally, of two filters 44 made of paper and other such material, one filter may be disposed adjacent the lower surface 46 of top percolation element 20, and the second filter may be disposed adjacent the bottom surface 48 of bottom percolation element 22.

In use, in order to make coffee and the like, with ground coffee or the like being placed between filters 44 in the middle of top and bottom percolation elements 20, 22, respectively, elements 20, 22 may be sealingly pressed together, with the top percolation element 20 inserted or snapped securely in bottom percolation element 22 to assure coffee or the like will stay securely in place. This would provide beverage container 10 with the capacity for multiple flavoring such as coffee, sugar, cream and the like, at predetermined or subjective quantities by an end-user. Alternatively, it should be evident that top and bottom percolation elements 20, 22, respectively, may be pre-sealed together to include ground coffee or the like placed between filters 44 in the middle of top and bottom percolation elements 20, 22, respectively. With hot water and other liquid added up to filling line 14, percolating mechanism 18 may be moved upwards and downwards for a few seconds until coffee/tea is made to the desired consistency, i.e. light or strong, depending on an individual's personal taste. In this manner, percolating mechanism 18 may be moved upwards and downwards such that water or other liquid flows in a generally axial or transverse direction from a top or bottom perforation to an axially corresponding or offset bottom or top perforation to mix the coffee or other product with the water or other liquid. As discussed above with reference to FIGS. 7 and 8, for stem 36 including alignment rib 38 for engagement with notch 40 of top percolation element 20, top and bottom percolation elements 20, 22, respectively, may be oriented such that water or other liquid flows in a generally axial direction from a top or bottom perforation to an axially corresponding bottom or top perforation, for providing optimal mixing. Alternatively, it should be understood that if needed, notch 40 may be provided such that top and bottom percolation elements 20, 22, respectively, are oriented such that water or other liquid flows in a generally transverse direction from a top or bottom perforation to a corresponding bottom or top perforation.

With spoon 42 inserted in stem 36, after adequate mixing, percolating mechanism 18 may be pulled out of cup 12 by means of stem 36 and discarded. Spoon 42 may then be used to stir the mixed beverage with sugar, sweetener, non dairy cream, and other such additives as desired, which may be disposed on top of top percolation element 20 and sealed by lid or seal 16.

Beverage container 10 may include a warranty seal around lid or seal 16 to preserve, under strict standards of hygiene, the flavors and aroma of the coffee/tea or others, and to secure the contents therein.

Beverage container 10 according to the present invention is advantageous in that it facilitates the preparation of coffee (or tea) in a very simple, easy, practical, personal and economical way. Coffee/tea can be prepared in almost any place simply by adding hot water or other liquids. There is no need to use conventional tableware to enjoy a cup of coffee. There is no need to look for sugar, sweetener or cream elsewhere.

Beverage container 10 may be utilized in a variety of places, including for example, the house, office, work, fast food, home deliveries, coffee shops, universities, stadiums, theme parks, picnics, planes, ships, yachts, police, army, hospitals, convenience stores, etc. Beverage container 10 is also entirely hygienic and disposable, easy to obtain (availability in market) and to carry out, easy to buy and quickly drink in a Coffee-Shop or anywhere else. Further, beverage container 10 enables coffee producers to offer their consumers different types of quality coffee. For example, coffee can vary from one country to another, or depending on altitude within the same country, can vary in taste. Thus it is often difficult for a consumer to realize what brand or flavor of coffee he/she is drinking. Beverage container 10 alleviates the aforementioned situation by enabling a consumer to know and to choose the special kind of coffee/tea he/she prefers, as well as to prepare it exactly how he/she wants, in a very easy way.

The invention thus achieves the aforementioned objects in that it provides an all-in-one disposable beverage container which is simple yet versatile in operation, which allows an end user to subjectively flavor coffee, tea and other such beverages, with sugar, cream and other such additives, as desired, and which is cost-effective in design, yet sanitary in operation for mixing and disposing of used product. Moreover, as discussed above, the invention provides an all-in-one disposable beverage container which has superior liquid flow dynamics for mixing a beverage mix with a liquid, as compared to prior art beverage mixing containers.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An all-in-one beverage container for providing a mixed beverage product, said container comprising:
   a disposable cup for holding a liquid;
   a percolating mechanism for holding a beverage mix at a predetermined location within said disposable cup, said beverage mix is provided in at least one of a solid, granular, gel and packaged form;
   a filter coupled to said percolating mechanism for separating said beverage mix from liquid disposable in said disposable cup; and
   a stem coupled to said percolating mechanism for enabling axial movement of said percolating mechanism relative to a longitudinal axis of said disposable cup, said stem enables mixing of said beverage mix with the liquid by axial reciprocation of said percolating mechanism and enables removal of said percolating mechanism from said disposable cup upon mixing of said beverage mix with said liquid for thereby providing said mixed beverage product,
   wherein said all-in-one beverage container enables a consumer to know and to choose the type of beverage mix the consumer prefers, and thereby prepare a customized mixed beverage product, wherein said percolating mechanism includes top and bottom percolation elements, wherein said top percolation element includes a plurality of preformed first perforations, said first perforations are disposed at predetermined radial and angular intervals, and wherein said bottom percolation element includes a plurality of preformed second perforations, said second perforations are disposed at predetermined radial and angular intervals, wherein said top and bottom percolation elements are aligned such that said first and second perforations are axially aligned such that liquid flows in a generally axial direction from a first or second perforation to an axially corresponding second or first perforation during axial reciprocation of said percolating mechanism for providing optimal mixing, and wherein said top and bottom percolation elements are aligned by means of a notch on said top percolation element being aligned with a rib on said stem attached to said bottom percolation element.

2. An all-in-one beverage container according to claim 1, wherein said percolating mechanism includes top and bottom percolation elements, said top and bottom percolation elements are separable from each other to enable insertion of said beverage mix between said top and bottom percolation elements.

3. An all-in-one beverage container according to claim 1, wherein said percolating mechanism includes top and bottom percolation elements, said top and bottom percolation elements are presealed together and include said beverage mix between said top and bottom percolation elements.

4. An all-in-one beverage container for providing a mixed beverage product, said container comprising:
   a disposable cup for holding a liquid;
   a percolating mechanism for holding a beverage mix at a predetermined location within said disposable cup, said beverage mix is provided in at least one of a solid, granular, gel and packaged form;
   a filter coupled to said percolating mechanism for separating said beverage mix from liquid disposable in said disposable cup; and
   a stem coupled to said percolating mechanism for enabling axial movement of said percolating mechanism relative to a longitudinal axis of said disposable cup, said stem enables mixing of said beverage mix with the liquid by axial reciprocation of said percolating mechanism and enables removal of said percolating mechanism from said disposable cup upon mixing of said beverage mix with said liquid for thereby providing said mixed beverage product,
   wherein said all-in-one beverage container enables a consumer to know and to choose the type of beverage mix the consumer prefers, and thereby prepare a customized mixed beverage product, and wherein said stem is hollow, said container further includes a spoon disposed within said hollow stem such that said spoon enables stirring of said beverage mix after removal of said percolating mechanism.

5. An all-in-one beverage container for providing a mixed beverage product, said container comprising:
   a disposable cup for holding a liquid;
   means for holding a beverage mix at a predetermined location within said disposable cup, said beverage mix is provided in at least one of a solid, granular, gel and packaged form; and
   means for reciprocating coupled to said means for holding for enabling axial movement of said means for holding relative to a longitudinal axis of said disposable cup, said means for reciprocating enables mixing of said beverage mix with the liquid by axial reciprocation of said means for holding and enables removal of said means for holding from said disposable cup upon mixing of said beverage mix with said liquid for thereby providing said mixed beverage product
   wherein said all-in-one beverage container enables a consumer to know and to choose the type of beverage mix the consumer prefers, and thereby prepare a customized mixed beverage product, wherein said means for holding includes top and bottom percolation means, wherein said top percolation means includes a plurality of preformed first perforations, said first perforations are disposed at predetermined radial and angular intervals, and wherein said bottom percolation means includes a plurality of preformed second perforations, said second perforations are disposed at predetermined radial and angular intervals, wherein said top and bottom percolation means are aligned such that said first and second perforations are axially aligned such that liquid flows in a generally axial direction from a first or second perforation to an axially corresponding second or first perforation during axial reciprocation of said means for holding for providing optimal mixing, and wherein said top and bottom percolation means are aligned by a notch on said top percolation means being aligned with a rib on said means for reciprocating attached to said bottom percolation means.

6. An all-in-one beverage container according to claim 5, wherein said means for holding includes top and bottom percolation means, said top and bottom percolation means are separable from each other to enable insertion of said beverage mix between said top and bottom percolation means.

7. An all-in-one beverage container according to claim 5, wherein said means for holding includes top and bottom percolation means, said top and bottom percolation means are presealed together and include said beverage mix between said top and bottom percolation means.

8. An all-in-one beverage container according to claim 5, further comprising a filter coupled to said means for holding for separating said beverage mix from liquid disposable in said disposable cup.

9. An all-in-one beverage container for providing a mixed beverage product, said container comprising:
   a disposable cup for holding a liquid;
   means for holding a beverage mix at a predetermined location within said disposable cup, said beverage mix is provided in at least one of a solid, granular, gel and packaged form; and
   means for reciprocating coupled to said means for holding for enabling axial movement of said means for holding relative to a longitudinal axis of said disposable cup, said means for reciprocating enables mixing of said beverage mix with the liquid by axial reciprocation of said means for holding and enables removal of said means for holding from said disposable cup upon mixing of said beverage mix with said liquid for thereby providing said mixed beverage product
   wherein said all-in-one beverage container enables a consumer to know and to choose the type of beverage mix the consumer prefers, and thereby prepare a customized mixed beverage product, wherein said means for holding includes top and bottom percolation means, wherein said top percolation means includes a plurality of preformed first perforations, said first perforations are disposed at predetermined radial and angular intervals, and wherein said bottom percolation means includes a plurality of preformed second perforations, said second perforations are disposed at predetermined radial and angular intervals, wherein said top and bottom percolation means are aligned such that said first and second perforations are axially aligned such that liquid flows in a generally axial direction from a first or second perforation to an axially corresponding second or first perforation during axial reciprocation of said means for holding for providing optimal mixing, and wherein said top and bottom percolation means are aligned by a notch on said means for reciprocating being aligned with a rib on said top percolation means.

10. An all-in-one beverage container for providing a mixed beverage product, said container comprising:
    a disposable cup for holding a liquid;
    means for holding a beverage mix at a predetermined location within said disposable cup, said beverage mix is provided in at least one of a solid, granular, gel and packaged form; and
    means for reciprocating coupled to said means for holding for enabling axial movement of said means for holding relative to a longitudinal axis of said disposable cup, said means for reciprocating enables mixing of said beverage mix with the liquid by axial reciprocation of said means for holding and enables removal of said means for holding from said disposable cup upon mixing of said beverage mix with said liquid for thereby providing said mixed beverage product wherein said all-in-one beverage container enables a consumer to know and to choose the type of beverage mix the consumer prefers, and thereby prepare a customized mixed beverage product, and wherein said means for reciprocating is hollow, said container further includes a spoon disposed within said hollow means for reciprocating such that said spoon enables stirring of said beverage mix after removal of said means for holding.

* * * * *